United States Patent [19]

Lautenschläger et al.

[11] 4,251,166

[45] Feb. 17, 1981

[54] MITER JOINT BINDER FOR MOLDINGS

[75] Inventors: Karl Lautenschläger, Reinheim; Gerhard W. Lautenschläger, Brensbach-Wersau, both of Fed. Rep. of Germany

[73] Assignee: Karl Lautenschläger KG, Mobelbeschlagfabrik, Reinheim, Fed. Rep. of Germany

[21] Appl. No.: 51,133

[22] Filed: Jun. 22, 1979

[30] Foreign Application Priority Data

Jun. 23, 1978 [DE] Fed. Rep. of Germany ....... 2827611

[51] Int. Cl.³ ............................................. F16B 12/20
[52] U.S. Cl. .................................... 403/402; 403/408
[58] Field of Search ....................... 403/12, 16, 19, 33, 403/91, 145, 148, 231, 159, 290, 401, 402, 406, 407, 408, DIG. 9, 409

[56] References Cited

U.S. PATENT DOCUMENTS 3,099,051  7/1963  Chenoweth .......................... 403/402

FOREIGN PATENT DOCUMENTS 1203598  8/1970  United Kingdom ..................... 403/402

Primary Examiner—Werner H. Schroeder

[57] ABSTRACT

Clamping binder for angularly meeting moldings, having two levers joined pivotingly to one another, each having on one of its free ends a fastening pin projecting approximately parallel to the pivot axis and insertable each into one of the moldings to be joined, and a tightening screw adjustably fastened to the one lever and bearing against the other lever whereby the levers can be pivoted towards one another in the sense of a movement of the fastening pins.

7 Claims, 10 Drawing Figures

MITER JOINT BINDER FOR MOLDINGS

BACKGROUND

The invention concerns a miter joint binder for binding together moldings which meet at an angle.

With the changing trends in interior decoration, furniture is increasingly being sought which is reminiscent in styling of furniture of bygone eras. Therefore cabinets are being produced whose door openings are surrounded by projecting or receding moldings fastened to the carcass of the cabinet. At points where such moldings abut one another at an angle, e.g., at the corner of the cabinet where a vertical molding meets a horizontal molding at a right angle, a so-called miter joint is formed where the moldings are each cut off at angles of 45° and then have to be set flush against one another and joined. Heretofore the moldings have been glued together, for example, at the joint, additional doweling or interlocking being generally required. The production of such glued miter joints is not only time-consuming on account of the time required for the glue to set, but also requires considerable labor. Moreover, after the glue has set the moldings meeting at such a miter joint can no longer be separated without damage, if, for example, it develops that a frame glued up from such moldings has to be remade for precise fitting to a cabinet carcass.

THE INVENTION

The invention is therefore addressed to the object of creating a miter joint binder for moldings to be mitered together, which can be assembled and disassembled quickly and easily, and which also will permit the joint to be retightened if it has become loose due to shrinkage produced by the drying of the moldings, for example.

The miter joint binder of the invention accomplishes this object by means of two levers fulcrumed on one another, each having at one end fastening pins projecting approximately parallel to their pivot axis, which can be fitted into one of the moldings to be joined together, and a tightening means adjustably disposed in the one lever and bearing against the other lever, whereby the levers can be operated so as to draw the fastening pins toward one another. The miter joint binder thus constructed can be disposed so as to be hidden from view on the back of the joined moldings by inserting the fastening pins into bores provided therefor while the moldings are loosely laid together, and then tightening the levers scissor-wise by the tightening means. The fastening pins will thus positively be brought together and press the miter surfaces of the moldings together such that a stable miter joint is achieved.

In a preferred further development of the invention, the lever have each a substantially straight section adjacent the ends bearing the fastening pins, followed by a curved or bent section, so that, in plan, the installed fastening means as a whole is in the shape of an angular piece whose base angle is variable by the tightening means.

The design is preferably such that the curved or bent end of the one lever is articulated in an area between the ends of the second lever. One of the levers therefore acts as a lever of the first kind, while the other is a lever of the third kind. The tightening means serving for the tightening of the miter joint binder is advantageously in the form of an adjusting screw threaded into a tap in the bent end of the second lever, with the outside end of its threaded shank engaging a surface provided on the first lever. The clamping force of the joining means is therefore produced by means of this set screw, which transmits the turning force exercised on it to the abutment provided on the lever which is a lever of the third kind, on the one hand, and on the other hand to the second arm of the lever which is a lever of the first kind. In order to achieve a very uniform stressing of the levers by the tightening forces, the miter joint binder can be constructed in an advantageous further development such that the one lever straddles the other in the crossing areas. Preferably the first lever straddles the second lever, and the surface provided for the set screw threaded into the second lever is provided between the forked sections of the first lever.

The fastening pins can have a circular cross section approximately matching the diameter of the bore in the moldings, and can have a plain cylindrical surface. The clamping forces acting after the miter joint binder has been tightened prevent any accidental escape of the fastening pins from the corresponding bores. Additional security against such escape, however, can also be achieved by providing at least one, preferably more, knife-edged holding ridges running circumferentially around them, which penetrate into the material of the wall of the fastening bore when the miter joint binder is tightened, thus producing a positive retention of the fastening pins in the fastening bores in addition to the frictional fastening.

At the same time the design is preferably made such that the ridges extend over a circumferential angle of up to about 180° in the facing areas of the fastening pins.

The invention will be further explained in the following description of an embodiment thereof, in conjunction with the drawings, wherein.

Figure 1:
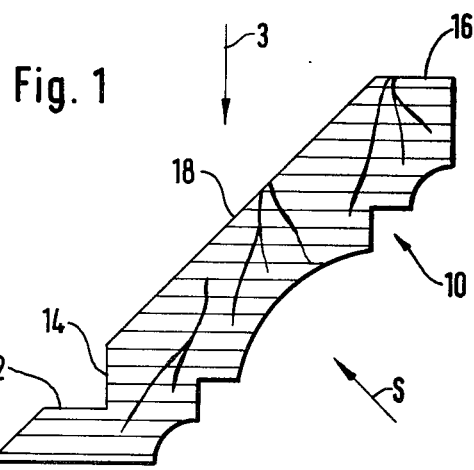
FIG. 1 is a cross sectional view taken through a molding which can be joined to a similar molding by means of the miter joint binder of the invention.

FIG. 1 is intended to show the nature of the moldings which are to be joined by a miter joint, and is a cross-sectional view taken through such a molding 10, whose molded face side is indicated by the arrow S. The moldings 10 are used as a rule in the attitude indicated, at an inclination of about 45°, so that a frame made from them flares outwardly from the inside or inwardly from the outside, such moldings being commonly referred to as "sprung moldings." The back 18 of the molding, which is not exposed to view, and is accordingly disposed at an angle of 45°, is substantially planar, although surfaces 12, 14 and 16, which again are at a 45° angle with respect to the back of the moldings, serve for fastening the moldings in the desired inclined position on the straight walls of cabinets or the like.

Figure 2:
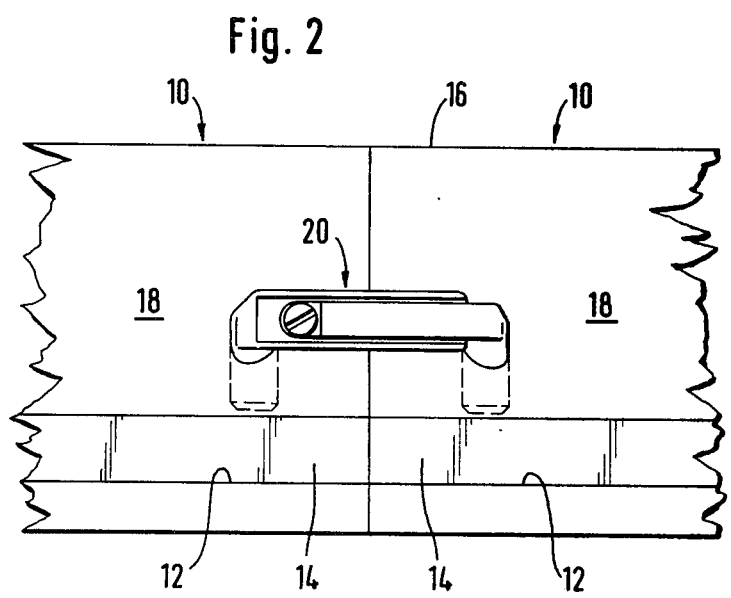
FIG. 2 is a view of a miter joint between moldings held together by the miter joint binder of the invention, as seen in the direction of the arrows 2 in FIGS. 3 and 4.
Figure 3:
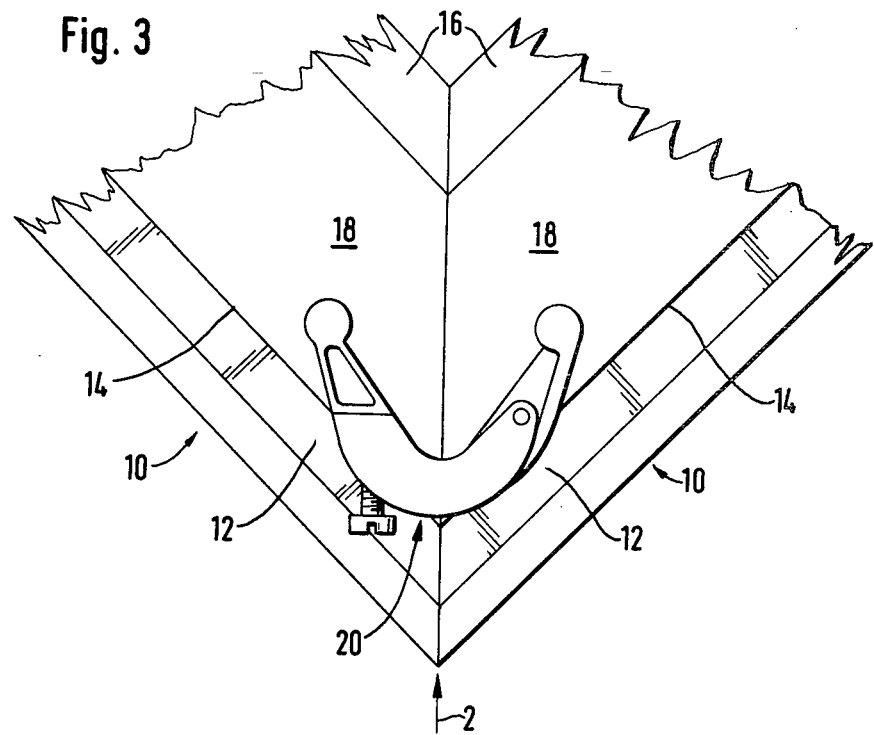
FIG. 3 is a plan view of a miter joint between moldings, which is held together by the binder of the invention, as seen in the direction represented by the arrow 3 in FIG. 1.
Figure 4:
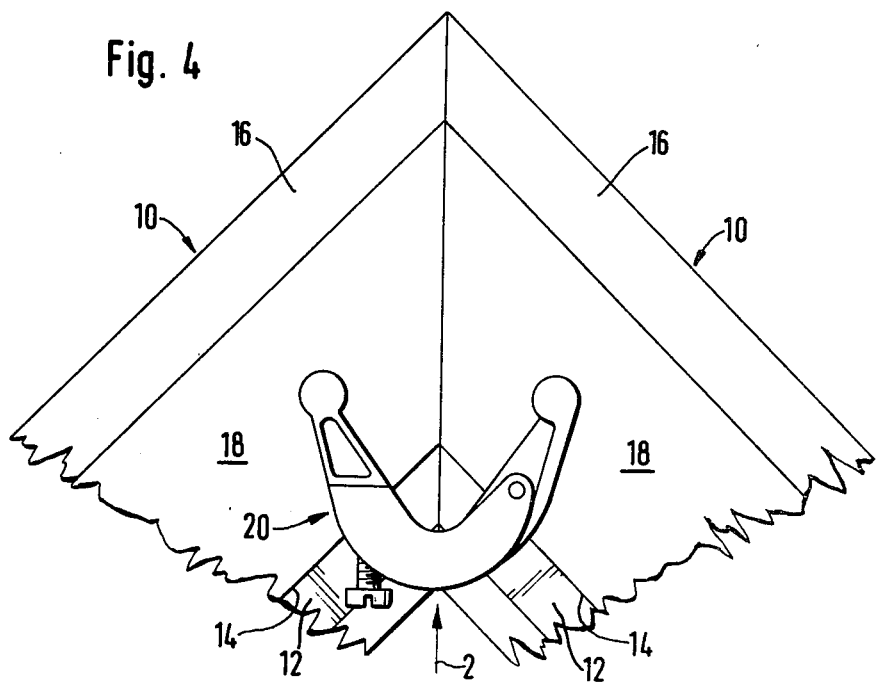
FIG. 4 is a plan view similar to FIG. 3 of a similar molding miter joint in which, however, the angle of the back of the molding in relation to the joint in FIG. 3 is reversed.
Figure 5:
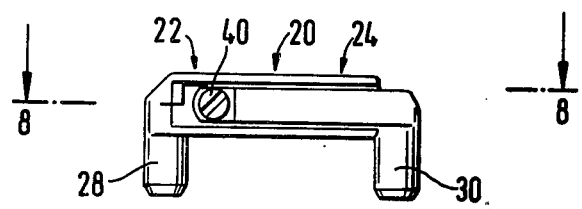
FIG. 5 is a rear elevational view of the miter joint binder of the invention corresponding to the viewing direction of FIG. 2.
Figure 6:
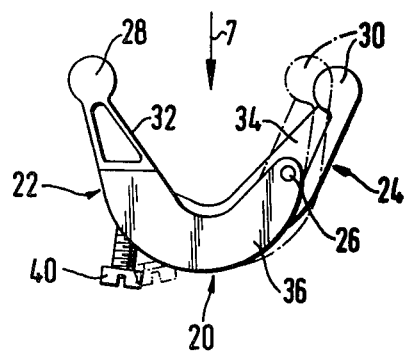
FIG. 6 is a plan view of the binder shown in FIG. 5.
Figure 7:
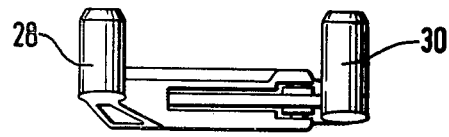
FIG. 7 is a front elevational view of the binder of FIGS. 5 and 6, as seen in the direction of the arrow 7 in FIG. 6.
Figure 8:
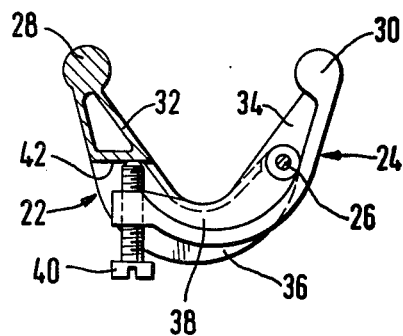
FIG. 8 is a cross-sectional view taken through the miter joint binder along the line indicated by the arrows 8—8 of FIG. 5.
Figure 9:
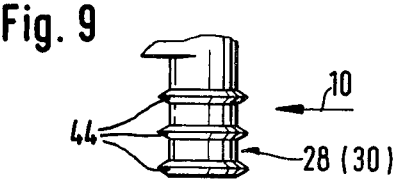
FIGS. 9 and 10 are a side and front elevational view, respectively, of a modified fastening pin of the miter joint binder of the invention, provided with holding ridges.
Figure 10:
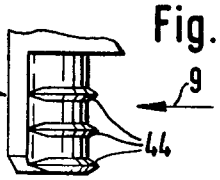

FIGS. 2 to 4 illustrate how two moldings are joined at a corner with a miter joint binder 20 of the invention, the difference between the joint shown in FIG. 3 and the one in FIG. 4 being that the moldings meet such that in the one case they form a receding frame and in the other case a projecting frame. The miter joint binder 20 must then be attached in the position shown, depending on the direction in which the back 18 of the moldings is inclined.

The miter joint binder 20 itself is shown in FIGS. 5 to 8 and is composed of two levers 22 and 24, respectively, which are pivotingly joined together by a fulcrum pin 26. The levers 22 and 24 each bear at one end a fastening pin 28 and 30, respectively, projecting in one direction parallel to the fulcrum axis, and these are adjoined by a straight lever section 32 and 34, respectively, which then merges with a curved or bent lever section 36 and 38, respectively. The curved sections 36 and 38, respectively, of the levers 22 and 24 are joined together such that the binder 20 has the V-shaped configuration shown in FIGS. 6 and 8. The fulcrum pin 26 passes through the end of the bent section 36 of the lever 22, which thus constitutes a lever of the third kind. The lever 24, however, is fulcrumed on the straight section 34 of the lever 24, which is thus a lever of the first kind. Into the end of the bent section 38 of the lever 24 there is threaded, at right angles to the fulcrum pin 26, an adjusting screw 40 whose forward shank end engages an abutment 42 on the lever 22. It can be seen that, by driving the set screw 40 inwardly, it is possible to rotate lever 24 relative to the lever 22 in the manner indicated by broken lines in FIG. 6, relatively great relative movements being achievable.

In order to achieve a uniform stressing on the levers by the tightening force, especially in the area of the fulcrum pin 26, lever 22 is divided by a slot in its bent or curved portion so as to straddle lever 24. The abutment 42 which is engaged by the end of the set screw 40 is therefore provided within the slot in the straddling portion of the first lever, at the point at which the divided sections merge with the solid, straight section 32.

In the miter joint binder 20 represented in FIGS. 5 to 8, the fastening pins 28 and 30 are of a plain cylindrical shape. Alternatively, however, they can be provided with the knife-edged holding ridges 44 extending circumferentially around them, which upon the tightening of the miter joint binder 20 penetrate into the walls of the bores in the moldings, and thus form an additional, positive security against removal of the fastening pins 28 and 30 from these bores. The holding ridges do not extend over the entire circumference of the fastening pins, but are provided only on the areas facing one another, over an angle of up to 180°. Since the clamping force of the fastening pins is transmitted to the bores in the moldings only in these areas, the provision of holding ridges is meaningful only in these areas.

We claim:

1. Clamping binder for two angularly meeting moldings, comprising: two levers joined pivotingly to one another at a pivot axis, each lever having a free end, two fastening pins respectively connected to the free ends, and projecting laterally from said ends and approximately parallel to the pivot axis and insertable respectively into the moldings to be joined, each lever having a section which is substantially straight in the area of the end bearing the respective fastening pin, and also has an adjoining curved or angled section, one lever being pivotingly joined at its curved or angled section to the other lever in an area on the other lever situated between the ends of the other lever, and tightening means adjustably fastened to one of said two levers and bearing against the other lever, said tightening means forming thrust-tightening means arranged between said curved or angled section of said other lever and a supporting surface at said one lever and upon actuation adapted to press apart the end of said other lever and the supporting surface, whereby the levers can be pivoted towards one another in the sense of movement of the fastening pins.

2. A clamping binder according to claim 1, wherein said tightening means is a tightening screw having a threaded shank and being threaded into a threaded bore in the curved or angled section of the other lever, said one lever having a supporting surface engaged by the front end of the threaded shank.

3. A clamping binder according to any one of claims 1 or 2, wherein said one lever straddles in a fork-like manner both sides of the other lever in the overlapping areas of said levers.

4. A clamping binder according to claim 3, wherein said supporting surface for the tightening screw threaded into the end of the other lever is provided between the forked sections of said one lever.

5. A clamping binder according to claim 1, wherein said fastening pins are provided each with at least one knife-edged holding ridge running circumferentially.

6. A clamping binder according to claim 5, wherein said at least one holding ridge extends over a circumferential angle of less than 360°, and in the areas of the fastening pins which face each other.

7. A clamping binder according to claim 6, wherein said angle is approximately 180°.

* * * * *